United States Patent
Grammel (10) Patent No.: US 7,924,740 B2
(45) Date of Patent: Apr. 12, 2011

(54) METHOD OF CONFIGURING AT LEAST ONE USER-SPECIFIC CONNECTION BETWEEN ACCESS POINTS TO A TRANSMISSION NETWORK WHICH ARE CONNECTABLE TO USER-LOCATED NETWORK DEVICES, AND APPARATUS THEREFOR

(75) Inventor: Gert Grammel, Uhingen (DE)

(73) Assignee: Alcatel, Paris (FR)

( * ) Notice: Subject to any disclaimer, the term of this patent is extended or adjusted under 35 U.S.C. 154(b) by 1333 days.

(21) Appl. No.: 10/373,027

(22) Filed: Feb. 26, 2003

(65) Prior Publication Data

US 2003/0169765 A1  Sep. 11, 2003

(30) Foreign Application Priority Data

Mar. 8, 2002 (EP) .................................... 02360082

(51) Int. Cl.
*G01R 31/08* (2006.01)
(52) U.S. Cl. ................. 370/254; 379/15.03; 379/201.12
(58) Field of Classification Search .................. None
See application file for complete search history.

(56) References Cited

U.S. PATENT DOCUMENTS

| | | | |
|---|---|---|---|
| 5,726,979 A * | 3/1998 | Henderson et al. ........... 370/254 |
| 5,774,689 A | 6/1998 | Curtis et al. | |
| 5,819,028 A * | 10/1998 | Manghirmalani et al. ...... 714/57 |
| 6,047,331 A * | 4/2000 | Medard et al. ................. 709/239 |
| 6,141,776 A * | 10/2000 | Grose et al. ...................... 714/37 |
| 6,338,046 B1 * | 1/2002 | Saari et al. ....................... 705/34 |
| 6,349,098 B1 | 2/2002 | Parruck et al. | |
| 6,360,255 B1 * | 3/2002 | McCormack et al. ......... 709/221 |
| 2001/0033550 A1 * | 10/2001 | Banwell et al. ............... 370/254 |

OTHER PUBLICATIONS

A. Galis, "Broadband Connectivity Management Service for Multi-Domain ATM and SDH Networks", Globecom 99, XP010373764, dated 2009 pp. 2002-2009.
Ku Hosson et al, Web-based Configuration Management Architecture for Router networks < Ericsson Inc., XP010376682, dated 2000 pp. 173-186.

* cited by examiner

*Primary Examiner* — Robert W Wilson
(74) *Attorney, Agent, or Firm* — Sughrue Mion, PLLC (57) ABSTRACT

A method of configuring at least one user-specific connection between access points of a transmission network, particularly of a highly available network, which are connectable to user-located network devices, and a server of a network management system, a management module for the server, a configuration tool, and a configuration module for the configuration tool are presented. Network data about the network devices and links between these network devices via which the user-specific connection can be established is determined, and planning data for a representation of the network is generated on the basis of which at least one availability criterion of the network devices or of the links is determinable. Planning data for a representation of the transmission network is then generated, on the basis of which at least one availability criterion of the network devices or of the links is determinable.

31 Claims, 5 Drawing Sheets

METHOD OF CONFIGURING AT LEAST ONE USER-SPECIFIC CONNECTION BETWEEN ACCESS POINTS TO A TRANSMISSION NETWORK WHICH ARE CONNECTABLE TO USER-LOCATED NETWORK DEVICES, AND APPARATUS THEREFOR

The invention is bases on a priority application EP 02 360 082.8 which is hereby incorporated by reference.

FIELD OF THE INVENTION

This invention relates to a method of configuring at least one user-specific connection between access points to a transmission network, particularly to a highly available transmission network, which are connectable to user-located network devices. The invention further relates to a server of a network management system therefor, to a management module for a server of a network management system therefor, to a configuration tool, particularly a configuration computer, therefor, and to a configuration module for a configuration tool therefor.

BACKGROUND OF THE INVENTION

On a transmission network provided by a network operator, a single user-specific, e.g., private, connection or a user-specific or private network can be created for a user. The user of the connection or network provides the network operator with the necessary configuration data. On the basis of data provided by the future user, which is typically in the form of verbal requirements profiles, the network operator creates the connection or network as a network service, so to speak. For this purpose, use is made, for example, of a network management system for managing, controlling, and monitoring the transmission network. The configuration data specify, for instance, the access points to the transmission network between which the connection or network is to be created. The configuration data may also include information about the desired availability, i.e., the fail-safety, of the connection or network.

To guarantee a desired availability, the network operator will, for instance, create so-called protected connections, that provide additional spare or protective transmission capacity that is available in the event of a failure of the normal capacity of the connection. The provision of spare transmission capacity is complicated and entails additional costs for the user.

To achieve a predetermined availability, it is also possible to build a user-specific or private ring network on the basis of a transmission network. In such a private ring network, each node of the transmission network is connected to two adjacent nodes. However, the exclusive assignment of network nodes to the ring network is also complicated, and the complexity of its implementation increases with increasing number of connections of the ring network. Furthermore, routing algorithms to be used by user-located network nodes, e.g., by IP routers (IP=Internet Protocol), particularly in case of a fault, are optimized for meshed networks, but not for ring networks. Moreover, large ring networks show a tendency towards instability.

To obtain connections that are as reliable as possible, the user can create connections or have connections created in such a way that from his or her point of view, they are likely to be routed through network devices and over transmission lines of the transmission network which are independent of each other. For instance, the user can select access points for the connections which are far apart. Still, two or more connections of the user-located network may be routed through common devices of the transmission network, for instance through a central network node. In the event of a failure of the common device, all connections routed through the latter will be out of order, so that the necessary reliability of the connections is actually not provided.

It is therefore an object of the invention to permit the creation of at least one user-specific connection, particularly of a user-located network, on a transmission network, particularly taking into account the availability of the transmission network.

SUMMARY OF THE INVENTION

The object is attained by a method according to the technical teaching of a method of configuring at least one user-specific connection between access points of a transmission network, particularly a highly available network, which are connectable to user-located network devices, the method comprising the steps of:
   determining network data about network devices of the transmission network and about links between these network devices via which the at least one user-specific connection can be established;
   generating planning data for a representation of the transmission network, on the basis of which at least one availability criterion of the network devices and/or of the links is determinable; and
   providing planning data for a configuration tool for configuring the at least one connection, the configuration tool being capable of generating the representation on the basis of the planning data.

Also provided for attaining the object are: a server of a network management system, a management module for a server of a network management system, a configuration tool, particularly a configuration computer, and a configuration module for a configuration tool, all according to the technical teachings of respective further independent claims.

The idea underlying the invention is that in order to configure at least one user-specific connection between access points to a transmission network which are connectable and/or connected to user-located network devices, network data are first determined about network devices of the transmission network and about links between these network devices via which the at least one user-specific connection, preferably a user-located network, can be set up. To put it in more abstract terms, the transmission network forms a first network on which at least one connection of a second network, namely of the user-located network, can be created. Means suitable for determining the network data are, for instance, a network management system or any other system that can capture network data about network devices and links of the transmission network. The transmission network is preferably a highly available network, such as an SDH network (SDH=Synchronous Digital Hierarchy) or a SONET (Synchronous Optical NETwork). From the network data ("raw data"), planning data is then generated which is suited for representing the transmission network. All network devices and links of the transmission network can be represented graphically and/or acoustically, for example, but it suffices to represent those facilities of the transmission network which can be used for the user-specific connection or the user-located network. Other facilities, which are not available for such connections or networks, may also be represented, however. The ability to plan the user-specific connection or the user-located network is improved by the fact that on the basis of the representation, at least one availability criterion of the network devices or links can be determined. For instance, in connection with the facilities of the transmission network, at least one availability criterion is graphically visualizable on the basis of the planning data. The planning data is made available to a configuration tool, e.g., a configuration computer, i.e., it is transmitted over the Internet or provided on a data carrier, for example. On the basis of the planning data, the configuration tool can generate the preferably graphical representation. A graphical representation serves in particular to configure the user-specific connection or the network "manually". In principle, however, a user-located configuration tool, using the planning data, particularly at least one availability criterion, could also configure the user-specific connection or the network "automatically", e.g., in a sort of autoroute function. In such a scenario, a graphical representation of the availability criterion is advantageous, but not absolutely necessary.

In any case, the user himself or herself can plan and configure "his" or "her" connection or "his" or "her" network, taking into account the availability of the facilities of the transmission network. The user can buy a fail-safety guaranteed by the operator of the transmission network, for instance in the form of so-called protected connections. On the basis of the availability known to him or her from the planning data, however, the user can plan his or her private, user-specific connections by himself or herself such that a required fail-safety is provided. To improve the fail-safety, the user can, for instance, also incorporate privately owned, transmission-network-independent network devices, links, or the like in the planning of his or her user-located network.

Further advantageous aspects and effects of the invention will become apparent from the dependent claims and the description.

Advantageously, the at least one availability criterion relates at least in part to the topology of the transmission network. The availability criterion represents, for example, the absolute spatial positions of the facilities of the transmission network, i.e., of the network devices and/or the links. Preferably, however, the availability criterion represents the respective spatial positions of the facilities relative to each other. For instance, facilities which are in close proximity to each other, particularly facilities of the same kind, such as network devices or links, are represented as respective logical facilities, e.g., as logical network devices or logical links, which could also be referred to as "topological links". Links which are provided on trunks that follow at least partly a common route are advantageously represented as one logical link. The same is advantageously the case with links that are carried by a common trunk. Such links are assigned, for example, to separate channels of the trunk. A ring network within the transmission network or any other sub-network of the transmission network is advantageously represented by a single logical network facility, which may be a logical node, for example.

The at least one availability criterion may also relate, for example, to the respective absolute fail-safety of a facility of the transmission network which is guaranteed by the network operator.

On the basis of the planning data and, if necessary, of additional operator entries, the configuration tool can generate configuration data for creating the at least one connection or the network on the transmission network. Advantageously, the configuration tool generates the configuration data for the at least one connection taking into account at least one configuration criterion relating to the network facilities required for the at least one connection, e.g., the respective availability. Such a configuration criterion can also be used by the configuration tool to check an operator entry which serves to create a user-specific connection. The configuration tool can also perform other plausibility checks on operator entries.

At any rate, the configuration tool advantageously transfers the generated configuration data, e.g., over the Internet or on a data carrier, to the network management system for creating the at least one user-specific connection. Advantageously, the configuration tool transmits the configuration data in a data format readable by the network management system, i.e., in a standardized format. It is understood that the network management system, too, can check the configuration data for plausibility on the basis of a checking criterion.

The configuration tool and/or the network management system can determine the overall availability of the at least one user-specific connection or the user-located network, particularly on the basis of the planning data. Such a determination takes into account the respective individual availabilities the transmission network facilities involved in the connection or network, the structure of the user-specific connection or the network, or the like. It is understood that on the basis of the total availability determined, the configuration tool and/or the network management system can also determine proposals for optimizing the availability of the user-specific connection or the user-located network.

The network management system preferably converts the configuration data into a user-specific connection or a user-located network in such a way that the user's topological requirements are fulfilled as exactly as possible in the predetermined manner. The configuration data specifies, for instance, that two user-specific connections are to be routed over two links of the transmission network which are separate in terms of their availability. Accordingly, the network management system will create the user-specific connections on two links which are actually spatially separated from each other.

It is also possible, however, that the network management system, automatically or in response to a corresponding operator entry, converts the user's requirements equivalently. The configuration data specifies, for example, that two user-specific connections are to be routed through spatially separated nodes of the transmission network with respective average availabilities. The network management system, however, will implement the two connections through a single node of the transmission network which has a high availability. The network management system may communicate this equivalent solution to the configuration tool or not.

BRIEF DESCRIPTION OF THE DRAWINGS

The invention will become more apparent from the following description of embodiments when taken in conjunction with the accompanying drawings, in which.

DETAILED DESCRIPTION OF THE INVENTION

Figure 1:
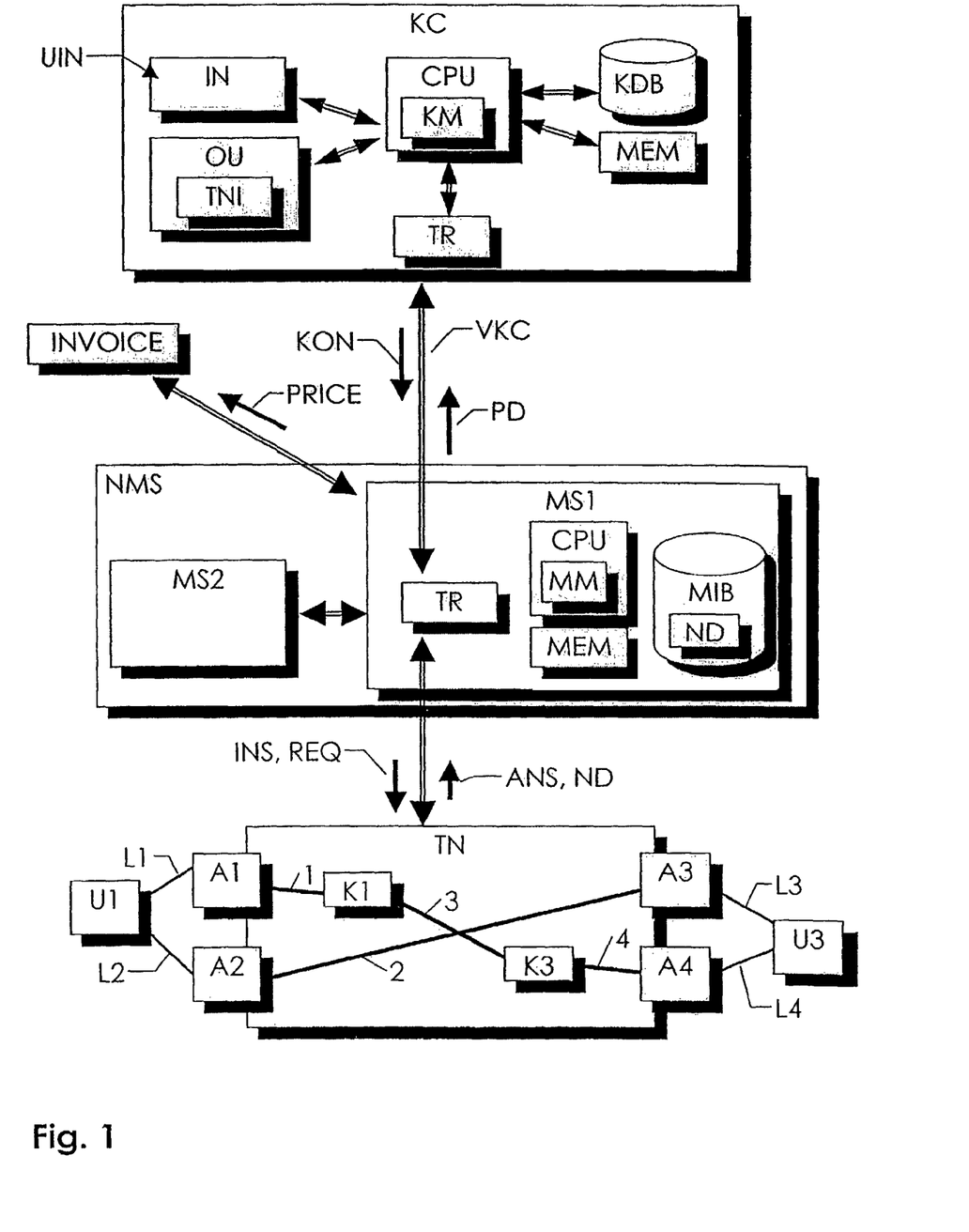
FIG. 1 shows an arrangement for carrying out the invention, comprising a partly illustrated transmission network TN which is controlled and monitored by a network management system NMS in accordance with the invention, the network management system NMS cooperating with a configuration tool KC in accordance with the invention.

FIG. 1 shows an exemplary arrangement with which the invention can be carried out. A transmission network TN is controlled and monitored by a network management system NMS, hereinafter called "management system NMS" for short. In the present example, transmission network TN is a switched telecommunications network, e.g., an SDH network or a telephone network, such as an ISDN telephone network (ISDN=Integrated Services Digital Network). In principle, transmission network TN could also be a routed network. In any case, transmission network TN contains links 1-17 on which user-specific connections can be created between access point A1-A13. Links 1-17 are, for instance, electric and/or optical trunks on which one or more connections can be created. The user-specific connections are, for instance, leased lines or the like.

Access points A1-A13 are, for instance, network devices for connecting transmission network TN to user-located network devices U1-U5, i.e., multiplexer-demultiplexers or the like. At access points A1-A13, the user-located, private network devices U1-U5 can feed data traffic into transmission network TN. Also at access points A1-A13, transmission network TN transmits data to network devices U1-U5. Links 1-17 are routed through network devices, for example through network nodes K1-K7, e.g., cross connects or switching centers, and through a multiplexer-demultiplexer MUX. Transmission network TN may contain further network devices (not shown in detail), e.g., a network node KN.

Management system NMS determines network data ND about network devices K1-K7, MUX of transmission TN and about links 1-17 between these network devices. Furthermore, in the embodiment shown, management system NMS manages transmission network TN. It can, for example, configure user-specific connections on transmission network TN, for instance establish and release such connections and modify parameters of the connections, such as the respective transmission capacity. Management system NMS can also monitor and control the transmission network TN, e.g., receive alarm messages from network devices A1-A13, K1-K7, MUX and send control instructions to the latter for removing a fault condition.

Management system NMS comprises servers MS1, MS2, which are connected with one another and with transmission network TN and a configuration tool KC by connection lines (indicated by arrows). Management system NMS could also contain only the server MS1 or include further servers (not shown). Server MS1 comprises a database MIB in which the network data ND are stored. The network data ND contain descriptions of the objects and functions connected in transmission network TN and manageable by management system NMS, e.g., of network nodes K1-K7 and access points A1-A13. Database MIB is, for instance, a so-called Management Information Base.

On the basis of the network data ND, management system NMS generates planning data PD for a representation TNI of transmission network TN, by means of which at least one availability criterion of network devices K1-K7, MUX and/or of links 1-17 can be determined. Management system NMS provides the planning data PD for configuration tool KC, which uses the planning data to generate the representation TNI for configuring a user-specific connection on transmission network TN. Management system NMS transmits the planning data PD over a connection VKC (represented schematically as an arrow) which is routed through the Internet or any other broadband network. In principle, the planning data PD could also be transported by means of floppy disks or any other data carriers.

The connection VKC is established by configuration tool KC, for example. Configuration tool KC preferably logs in to server MS1, specifying, for example, a password or the like. Configuration tool KC queries server MS1 for the planning data PD.

In the embodiment, configuration tool KC is a configuration computer. In the embodiment, configuration tool KC and server MS1 are basically of a similar design, which is shown and explained only schematically. The computers KC, MS1 are, for instance, personal computers or the like which are equipped for communication over the Internet or any other broadband network. They include connection means TR, for example Ethernet interface cards, modems, an ISDN adapter, or any other communications interface adapter. Connection means TR may also comprise a data carrier drive, such as a floppy disk drive, which can write or read data on a data carrier. Configuration tool KC, through its connection means TR, can receive planning data PD from management system NMS and send configuration data KON to the management system. Server MS1, through its connection means TR, can receive configuration data KON and send the planning data PD to the configuration tool KC. Furthermore, server MS1 communicates via connection means TR with transmission network TN. Computers KC, MS1 further include control means CPU and storage means MEM. Control means CPU is, for example, a processor which can execute program code stored in storage means MEM. The control means CPU of server MS1 executes, for example, the program code of a management module MM according to the invention, and the control means CPU of configuration tool KC executes, for example, the program code of a configuration module KM according to the invention. The storage means MEM are, for instance, hard disks, RAM modules (RAM=Random Access Memory), or so-called flash ROM modules (ROM=Read-Only Memory). Output means OU and input means IN are shown only in configuration computer KC. Such means OU, IN may also be provided in server MS1. The output means OU comprise, for example, one or more computer monitors, and the input means IN are, for example, a keyboard and/or a computer mouse. Further components of computers KC, MS1, such as internal connections as well as microphones, loudspeakers, or the like, are not shown for the sake of clarity. Computers KC, MS1 are operated by an operating system, such as UNIX.

Management system NMS and network devices A1-A13, K1-K7, MUX communicate, for instance, via the Simple Network Management Protocol (SNMP), which is based on the Transmission Control Protocol/Internet Protocol (TCP/IP), or via the Common Management Information Protocol (CMIP) according to OSI definitions (OSI=Open Systems Interconnection). For this purpose, management system NMS comprises, for example, so-called SNMP managers, which communicate with network devices A1-A13, K1-K7, MUX via so-called SNMP agents. The functions of an SNMP manager are performed by management module MM, for example.

The communication between configuration tool KC and server MS1 may be analogous. For instance, configuration module KM may act as an SNMP manager which queries management module MM for planning data PD. In this communication relationship between configuration tool KC and management system NMS, management module MM acts as an SNMP agent.

Figure 2:
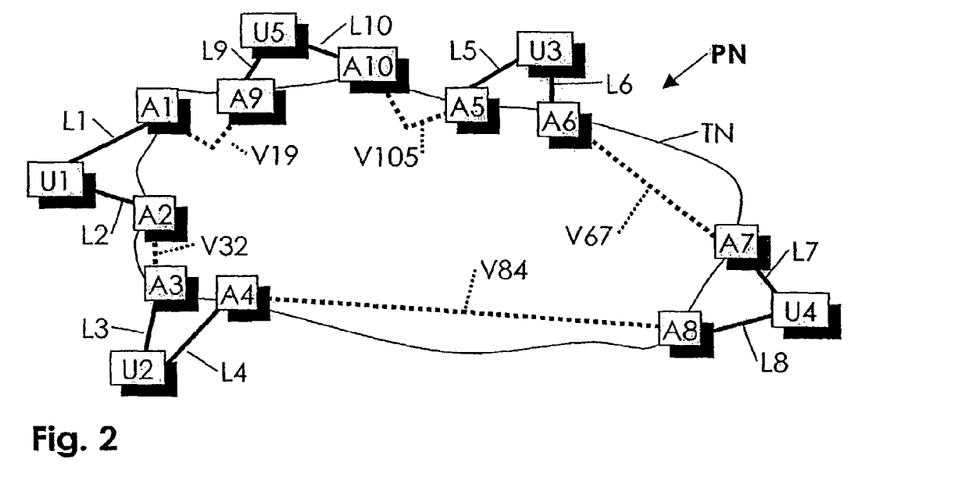
FIG. 2 shows a desired concept of a user-located, private network PN which is to be created on the transmission network TN.

On transmission network TN, a user-located, private network PN is to be created in the form of a ring network. The desired configuration of network PN is illustrated in FIG. 2. Network devices U1, U2, U3, U4, and U5 are connected by connections L1, L2; L3, L4; L5, L6; L7, L8; and L9, L10 to access points A1, A2; A3, A4; A5, A6; A7, A8; and A9, A10. Between access points A1 and A9, A10 and A5, A6 and A7, A8 and A4, and A3 and A2, connections V19, V105, V67, V84, and V32 are to be created which, for reasons of fail-safety, are to be routed over respective links of transmission network TN which are independent of each other. Starting from the schematic representation of FIG. 2, it could be assumed that connections V19, V105, V67, V84, and V32 are relatively far apart and, consequently, are routed over respective links of transmission network TN which are independent of each other. Actually, however, that may not be the case; this will now be explained with reference to FIG. 3.

Figure 3:
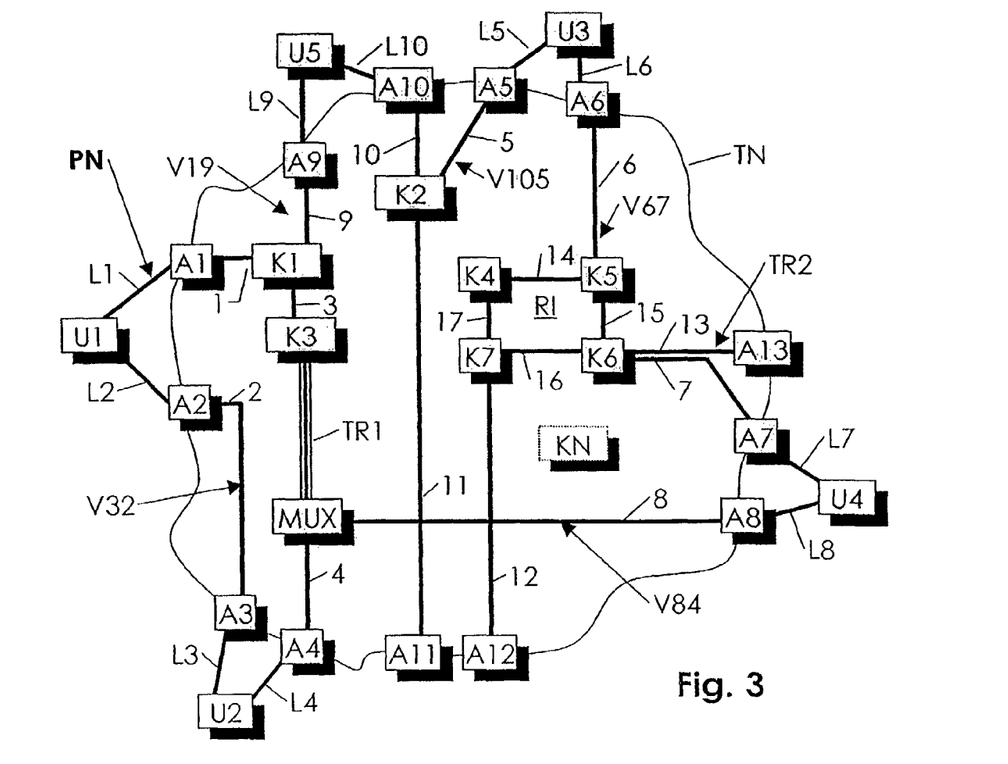
FIG. 3 is a more detailed view of the transmission network TN of FIG. 1, showing links 1-17 of the transmission network TN as well as connections between the transmission network TN and user-located network devices U1-U5 of a user-located network PN created on the transmission network TN.

Connections V19 and V84 are routed through network nodes K1 and K3. These are separate nodes, but they are close to each other, for instance in the same building. Therefore, there is a relatively high probability that in case of a fault in or a failure of one of network nodes K1, K3, the respective other network node K3, K1 is also faulty or has also failed. For instance, a supply voltage drop or a fire in the building containing network nodes K1 and K3 will result in a failure of both network nodes K1 and K3. Thus, a single point of failure is present. When a fault occurs there, the function of the entire network PN to be created is disturbed, since the ring structure is broken at two ring connections at the same time.

One solution to the problem would be for the operator of transmission network TN to make the connections V19, V105, V67, V84, and V32 fail-safe by a suitable different configuration, by the provision of fail-safe links, or the like. However, the user of network PN would have to pay for these measures; with these measures, which would have to be taken by the network operator, the utilization of transmission network TN would possibly not be optimal. According to the invention, therefore, the planning of network PN is shifted to the user of network PN. For this purpose, the management system MNS and the configuration tool KC cooperate in the manner according to the invention.

Figure 6:
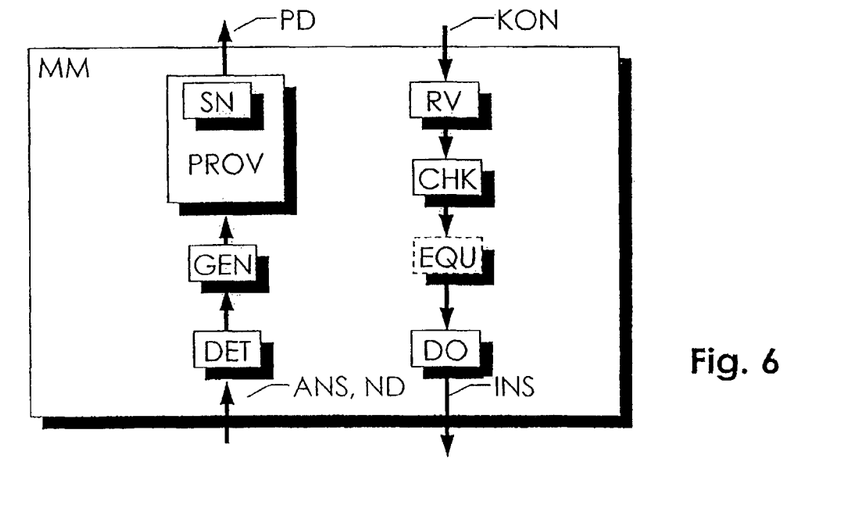
FIG. 6 is a schematic of a management module MM according to the invention included in the network management system NMS of FIG. 1.

First, management module MM determines the network data ND of transmission network TN with the aid of a function DET. To do this, server MS1, for example, sends query messages REQ to network devices A1-A13, K1-K7, MUX. In response to the queries, the network devices send reply messages ANS containing the network data ND or parts thereof. It is also possible that the function DET queries the database MIB for the network data ND or parts thereof and/or enters data from the reply messages ANS into database MIB.

The network data ND particularly contains information about the structure of the transmission network TN, e.g., that access point A1 is connected to network node K1 by a link 1, that network node K1 is connected to access point A9 by a link 9, that network nodes K1 and K3 are interconnected by a link 3, that access points A2 and A3 are interconnected by a link 2, and so forth. The network data ND may also contain further information. For instance, network nodes K1-K7 may inform management system NMS of their respective availabilities and/or their average loads. Other constituents of the network data ND, such as information about costs of the use of network nodes K1-K7, information about the extent of the recovery of damages in case of a fault in a network node K1-K7, information about the topology of transmission network TN or the like, are preferably stored in database MIB. As an availability criterion, the information that network nodes K1 and K3 are in close proximity to each other is stored in database MIB.

Figure 7:
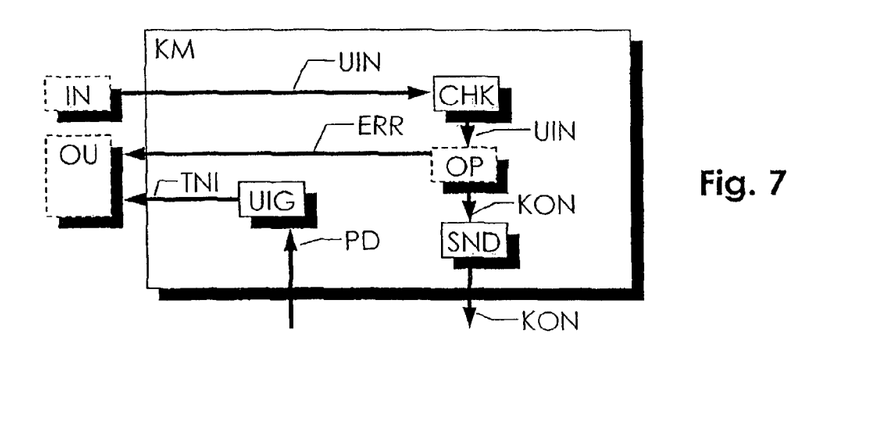
FIG. 7 is a schematic of a configuration module KM according to the invention included in the configuration tool KC of FIG. 1.

On the basis of the network data ND, a function GEN of management module MM generates the planning data PD. A function PROV with a send routine SN, which controls the connection means TR, for example, transfers the planning data PD to configuration tool KC, which, in the embodiment shown, processes the planning data PD with configuration module KM. On the basis of the planning data PD, a function UIG of configuration module KM generates the graphical representation TNI of transmission network TN, which is output at output means OU. The representation TNI is, for instance, a so-called graphical user interface or forms part of a graphical user interface. It is displayed in a window of a user interface, for example.

Figure 4:
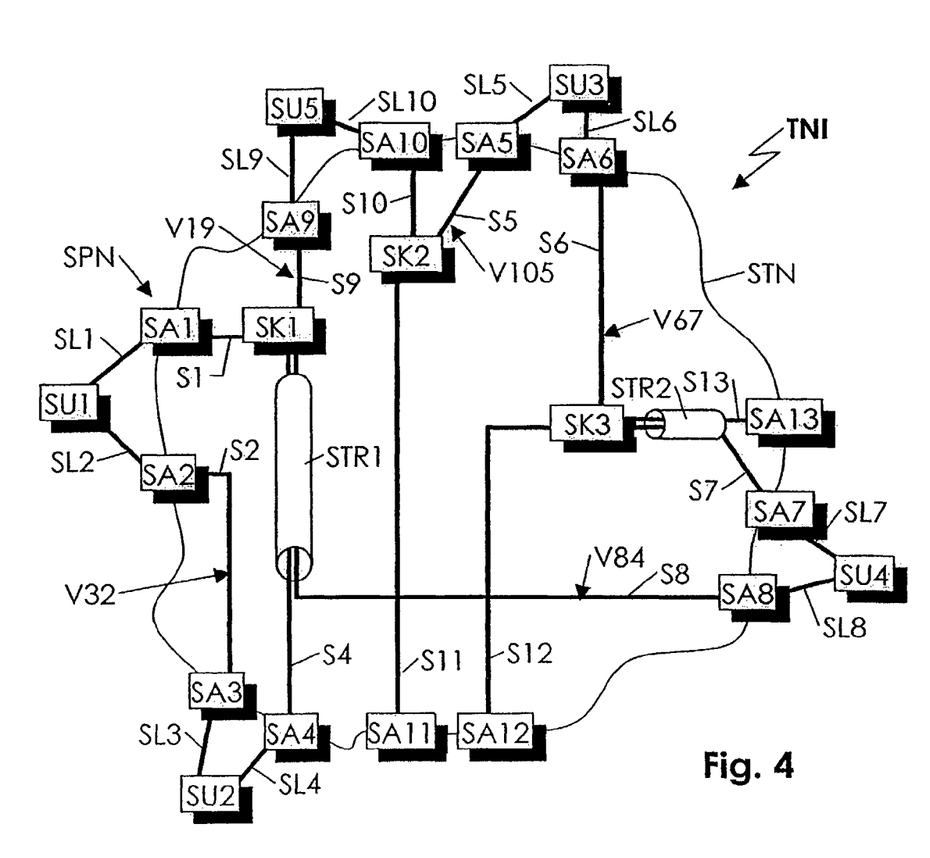
FIG. 4 is a graphical representation TNI of the transmission network TN generated by the configuration tool KC, including a schematic representation SPN of the network PN.

On the basis of the representation TNI, availability criteria of network devices A1-A13, K1-K7, MUX and of links 1-17 of transmission network TN can be determined. The representation TNI shows at least part of the topology of transmission network TN, namely the spatial positions of network devices A1-A13, K1-K7, MUX and of links 1-17 relative to each other. Access points A1-A13 are represented by symbols SA1-SA13. The respective positions of the symbols or icons SA1, SA9, SA10, SA5, SA6, SA13, SA7, SA8, SA12, SA11, SA4, SA3, SA2 (clockwise) along an outer boundary line STN of transmission network TN correspond, for example, to the positions of access points A1-A13 relative to each other. Symbols SA1 and SA13 as well as SA8 and SA12, for example, are relatively far apart, whereas symbols SA12, SA11, SA4, SA3 are relatively close together. In the planning data PD, geographical data of access points A1-A13 are specified as GPS data, for example (GPS=Global Positioning System). The planning data may also specify the distances between access points A1-A13 and/or between symbols SA1-SA13.

Further topological features of transmission network TN influence the availability of user-specific connections created or to be created on this network. Accordingly, these topological features are contained as availability criteria in the planning data PD and are graphically illustrated in the representation TNI.

For instance, network nodes K1 and K3, which are close to each other, are combined in one logical network device SK1, which is displayed as a single symbol. Logical network device SK1 carries the links 1, 9, 4, 8, represented by symbols S1, S9, S4, S8, from the access point symbols SA1, SA9, SA4, SA8. It is apparent from the representation TNI that the user-specific connections V84 and V19 are routed through logical network device SK1, so that the fail-safety (see FIG. 2) of network PN actually desired by the user is not provided. A ring network RI contained in transmission network TN is also specified in the planning data PD as a single logical network device SK3, which is graphically represented by a single symbol. Ring network RI contains network nodes K4-K7, which are interconnected by links 14-17 (enumerated clockwise). In reality (see FIG. 3), network node K7 is connected to access point A12 by a link 12, network node K5 is connected to access point A6 by a link 6, and network node K6 is connected to access points A13, A7 by links 13, 7. According to the information in the planning data PD, the representation TNI shows the ring network RI as a logical network device SK3, which is connected by symbolic links S6, S13, S7, and S12 to the symbols SA6, SA13, SA7, and SA12 of access points A6, A13, A7, and A12.

It is understood that in the representation TNI, unlike the illustration in the figures, access points that are close to each other could also be represented as single logical access points.

Links that are close to each other are specified in the planning data PD as single logical links, and are represented in the representation TNI by corresponding symbols.

A tubelike logical link STR1, for example, stands for a trunk TR1 between network node K3 and multiplexer MUX. Links 4 and 8 are carried on separate transmission channels of trunk TR1. In case of an outage of or a fault on trunk TR1, both links 4 and 8 will be affected, see the logical link STR1 in the representation TNI. Multiplexer MUX is represented by logical link STR1, too.

Portions of links 7 and 13 follow a common route TR2, which is represented by a tubelike logical link STR2.

Insofar as the physical layout of the network devices and links of transmission network TN does not affect the respective availability, these devices and links are represented by respective separate symbols, lines, icons, or the like. The symbols SA2 and SA3 of access points A2 and A3 are interconnected, for instance, by a linelike symbol S2 of link 2. Network node K2 is shown as a symbol SK2, which is connected by lines S5, S10, S11, which stand for lines 5, 10, 11, to access point symbols A5, A10, A11.

The representation TNI could, in principle, show only the transmission network TN. In the embodiment, however, the representation TNI additionally contains symbols SU1-SU5 for the user-located network devices U1-U5 and symbols SL1-SL10 for the links L1-L10 from these devices to access points A1-A13. The representation TNI also shows the relative positions of the user-specific network facilities U1-U5 to one another.

On the basis of the representation TNI, a user of configuration tool KC con plan and configure his or her private network PN, so to speak. Several approaches are possible. The user defines by operator entries UIN at input means IN which of access points A1-A13 are to be interconnected via transmission network TN. This can be done, for example, by entering a table or list containing corresponding predefinitions and/or by interconnecting the access point symbols SA1-SA13, for instance through a mouse action. In addition, the operator can predetermine the route to be followed by the user-specific connections on transmission network TN, for instance by specifying the links 1-17 to be used for the user-specific connections. In the case of a connection V613 between access points A6 and A13, for example, the user could specify that link 6 is to be used. It is also possible that configuration tool KC determines links of transmission network TN suitable for a user-specific connection on its own.

Configuration tool KC captures the operator entries UIN, in this embodiment with the aid of configuration module KM. Configuration module KM captures and checks the operator entries UIN by means of a checking function CHK and, if necessary, outputs an error message ERR. On the basis of the checked operator entries UIN, configuration tool KC generates the configuration data KON. Configuration tool KC can optimize the configuration data KON with an optional optimization module OP; for instance, it can select shorter and/or failsafe links, less expensive to use and/or fail-safe network devices of transmission network TN, or the like. During such an optimization, optimization module OP, which could also be provided in management module MM, can view only a single link or a single network device at a time. Preferably, however, optimization module OP evaluates the network PN, i.e., an availability of the network, as a whole.

Optimization module OP or a send function SND transfers configuration data KON to server MS1, which receives it with connection means TR and a receive function RV of management module MM. Management module MM, too, contains a checking function CHK for checking the configuration data KON and for outputting an error message upon detection of a plausibility error. An optional equivalence function EQU converts the configuration data KON into instructions INS, which are sent by a send function DO to network devices A1-A13, K1-K7, MUX of transmission network TN. On the basis of the instructions INS, network devices A1-A13, K1-K7, MUX create the user-specific connections to be created on transmission network TN in accordance with the configuration data KON.

In principle, it is also possible that the configuration data KON are already encoded in a format understandable by network devices A1-A13, K1-K7, MUX, so that management module MM can route the configuration data KON—after a plausibility check if necessary—directly to network devices A1-A13, K1-K7, MUX.

It is also possible that the equivalence function EQU, instead of converting the user-specific requirements on a one-to-one basis, converts at least part of these requirements equivalently, i.e., routes a user-specific connection, e.g. for reasons of a more uniform utilization of the capacity of transmission network TN, over an alternative link and/or through an alternative network device, in which case this link or device preferably has an availability at least equal to that of the link or network device actually desired by the user.

Furthermore, equivalence function EQU derives from the configuration data KON the information that links V19 and V84 are to be routed through logical network device SK1. Logical network device SK1 represents network nodes K1 and K3 as well as link 3. Equivalence function EQU converts the request for link V19 and V84 into the instruction INS in such a way, for example, that link V19 is routed through network node K1, and link V84 is routed through network node K3. In other words, management system NMS, i.e., in this embodiment the equivalence function EQU, evaluates the configuration data KON in such a way as to project a user-specific connection relating to a logical link and/or a logical network device onto one or more links or network devices which are physically present in transmission network TN and are associated with the logical link or logical network device, respectively.

The restricted availability of network PN as shown in FIGS. 3 and 4 could, in principle, be accepted. On the basis of the topological or quasi-topological representation TNI shown in FIG. 4, however, the variants of network PN shown in FIGS. 5A and 5B, for example, can be developed, in which availability is partially improved.

Figure 5A:
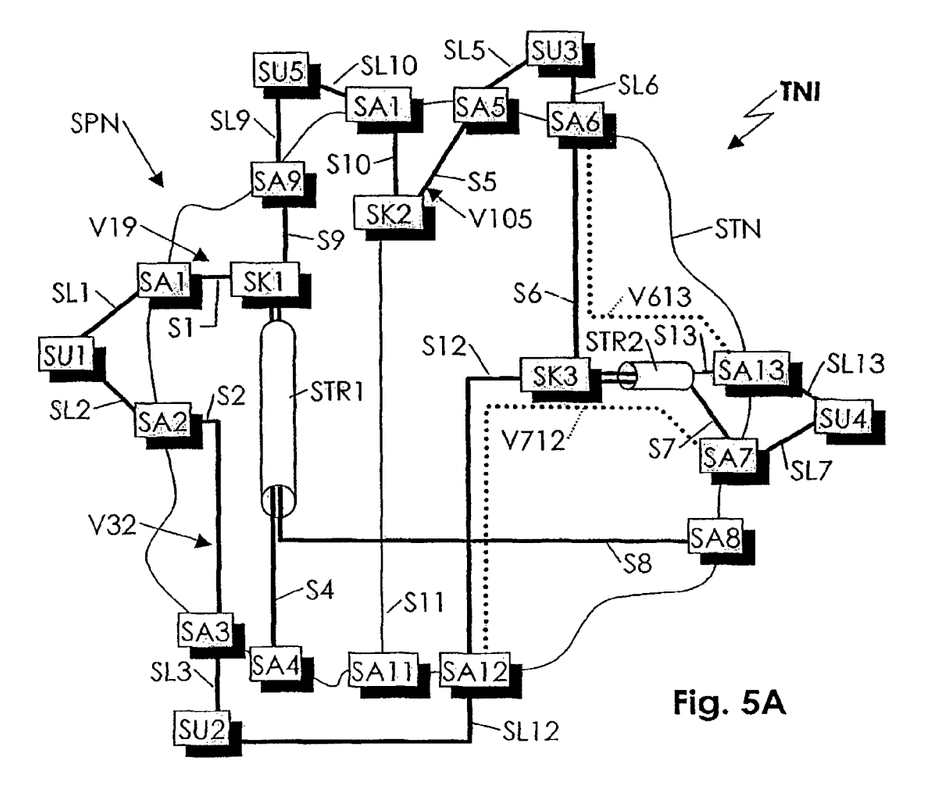
FIGS. 5A and 5B are representations corresponding to the representation TNI of FIG. 4, but each with a network PN modified in its configuration.

In the variant shown in FIG. 5A, instead of connection V84, for example, a connection V712 has been created on transmission network TN between access points A12 and A7, and instead of connection V67, a connection V613 has been created between access points A6 and A13. The user-located network device U2 is connected not to access point A4, but via a connection L12 to access point A12; this is illustrated in the representation TNI by corresponding symbols SL12, SA12. Furthermore, network device U4, instead of being connected to access point A8, is connected via a connection L13 to access point A13; this is illustrated by corresponding symbols SL13, SA13. Compared to the variant shown in FIG. 4, the availability of network PN is not improved by the new connection V712, since the connections V613 and V712 both follow the route TR2, but connection V712 is shorter than connection V84, whereby the load on transmission network TN and generally the operating cost of transmission network TN are reduced.

Figure 5B:
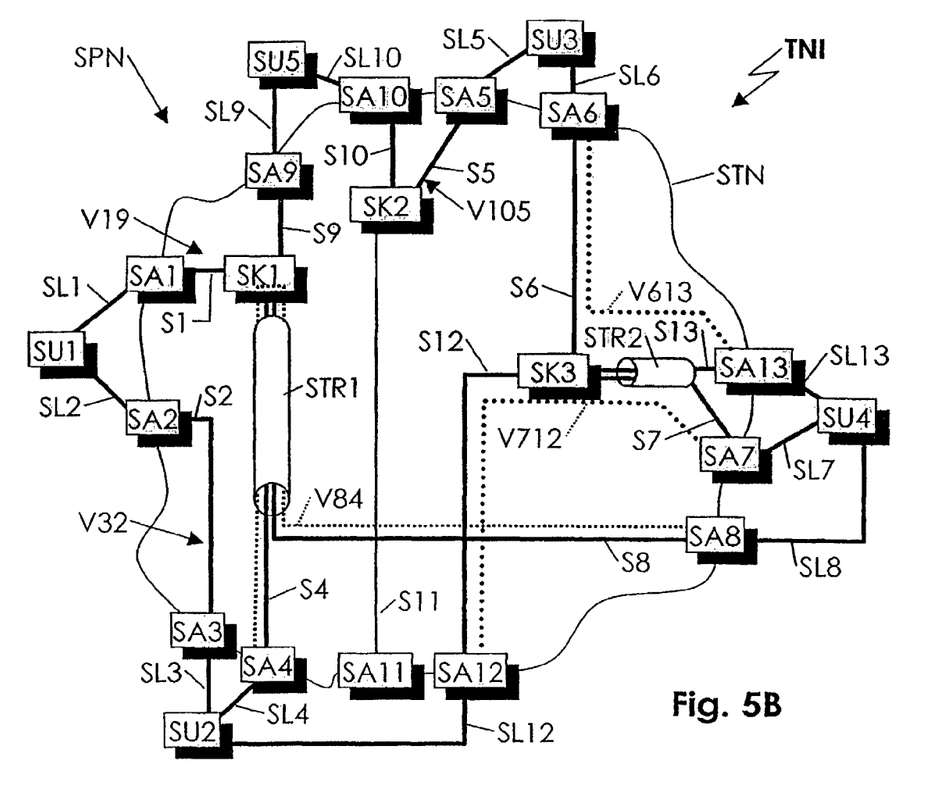

In the variant shown in FIG. 5B, in addition to the connection V712, the connection V84 has again been created on transmission network TN. Network devices U2 and U4 are connected via connections L4 and L8 to access points A4 and A8, respectively. Connections V84 and V712 are redundant, for example, so that in comparison with the variant shown in FIG. 5A, the availability of network PN is improved. If, for instance, an availability of P=95 percent is guaranteed for each of connections V84 and V712, a connection availability of $1-(1-P)^2=99.75$ percent is achieved between network devices U2 and U4 by the "parallel connection" of connections V84 and V712. In the variant shown in FIG. 5B, the network PN could also be referred to as an at least partially meshed network.

The operator of transmission network TN could, in principle, offer the planning service for network PN free of charge. Preferably, however, the management system NMS will determine charge data PRICE for the capture of the configuration data KON and/or for the creation of connections, such as connections V84 and V712. On the basis of the charge data PRICE, server MS1, for example, can prepare a bill of charges. It is also possible that management system NMS transfers the charge data PRICE to a billing facility INVOICE, which then prepares the bill.

Configuration tool KC stores the configuration data KON and/or the planning data PD in a database KDB. Configuration tool KC may store in database KDB the configuration of network PN shown in FIG. 5A, for example. These stored data can be retrieved later; on the basis of these data, e.g. the configuration of network PN shown in FIG. 5B can then be developed. A connection to management system NMS is not necessary for this development.

The planning data PD and/or the representation TNI may contain further advantageous information. This becomes apparent from a planning data record PDSK3 (see FIG. 8) which relates to the logical network device SK3 and may form part of the planning data PD. The planning data record PDSK3 contains availability information REL about the availability of network facility SK3. The availability information REL may be output by the configuration tool KC in the representation TNI by colored marking of the symbol for network device SK3 and/or as a so-called context-sensitive menu or context-sensitive information. The context-sensitive menu or information is displayed, for example, upon activation of a symbol assigned to the network device, e.g. by clicking a mouse button. Network devices or links with high or low availability/fail-safety may be represented, for example, by green or red symbols, respectively.

Figure 8:
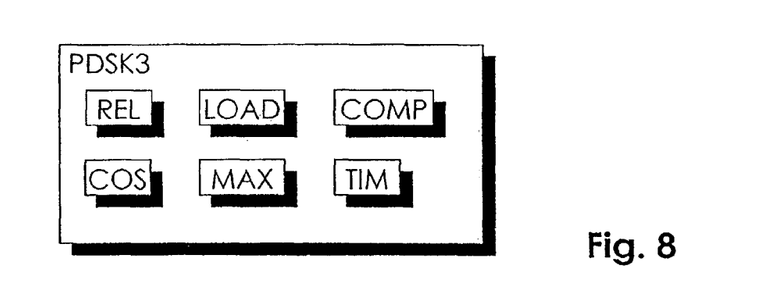
FIG. 8 shows a planning data record PDSK3 generated by the management system NMS of FIG. 1.

Further information is advantageous for the planning of a private connection on transmission network TN and may be contained in the planning data PD. For example, planning data may contain information about costs that are incurred by the use of one or more of the facilities of the transmission network. The planning data record PDSK3 includes, for example, cost information COST for the use of ring network RI. Thus, the user-located network PN can also be optimized from a cost point of view.

Furthermore, the planning data PD may include information about a load, e.g., a current and/or planned load, on one or more of the facilities of transmission network TN. The planning data record PDSK3 includes, for example, load information LOAD about the current load on ring network RI and load information MAX about the maximum possible load on ring network RI.

The planning data PD may also include information for a possible case of a fault in one or more facilities of the transmission network. The planning data record PDSK3 includes, for instance, information COMP about the extent of the recovery of damages in case of a fault. Furthermore, the planning data record PDSK3 includes information TIM about a typical downtime of one or more network nodes K1-K7 until removal of a fault.

The configuration tool KC can output the aforementioned information REL, COS, LOAD, MAX, TIM, COMP at the output means OU as a table and/or as context-sensitive information at the symbol for network device SK3.

Modifications and further developments of the invention and of the embodiment are readily possible.

In the figures, only one form of the representation TNI is shown schematically by way of example. In another form of representation (not shown), to which one can switch by clicking a mouse button, for example, the network devices A1-A13, K1-K7, MUX are arranged on a sort of map, for example, so that their absolute spatial positions are determinable.

The invention claimed is:

1. A method of configuring, by a client user using a personal computer, at least one user-specific connection between access points of a transmission network, which are connectable to user-located network devices, the method comprising the steps of:

determining, using the personal computer, network data related to other network devices of the transmission network which differ from the user-located network devices, and about links between the other network devices via which the at least one user-specific connection can be established;

generating network planning data for a representation of the transmission network, on the basis of which at least one availability criterion of the other network devices or of the links between the other network devices is determinable; and providing the network planning data for a configuration tool for allowing the client user to configure the at least one user-specific connection, the configuration tool generating the representation on the basis of the network planning data;

wherein the network data contains information of the structure of the transmission network and the availability and loads of the network devices, and the network planning data specifies geographical data of access points;

wherein the network planning data is derived from network data representative of a network topology of the transmission network;

generating the network planning data on the basis of the network data, and generating a graphical representation of the transmission network on the basis of the network planning data by determining availability criteria of the network devices and the links and configuring the user-specific connection.

2. The method as set forth in claim 1, wherein the at least one availability criterion relates at least in part to the topology of the transmission network, particularly to absolute spatial positions of the other network devices or the links between the other network devices or to the absolute spatial positions of the network devices or the links between the other network devices relative to each other.

3. The method as set forth in claim 1, wherein the network planning data represents the at least one availability criterion in such a way that network devices lying closely together or links lying closely together are represented as a single logical network device or a single logical link, respectively, or that at least one ring network provided in the transmission network is graphically represented as a single logical network device.

4. The method as set forth in claim 3, wherein links carried by trunks which follow at least partly a common route, or links carried by a single trunk and assigned in particular to separate transmission channels of the trunk are represented as respective single logic links.

5. The method as set forth in claim 1, wherein the at least one availability criterion relates to the respective fail-safety of the network devices or the links between the other network devices.

6. The method as set forth in claim 1, wherein the network planning data includes cost information about costs of a use of at least one of the network devices or of at least one of the links between the other network devices.

7. The method as set forth in claim 1, wherein the network planning data include load information about a particularly current or planned or maximum load on or utilization of at least one of the network devices or the links between the other network devices.

8. The method as set forth in claim 1, wherein on the basis of the network planning data, at least a first link and a second link of the links between the other network devices are determinable as links which are separate in terms of the at least one availability criterion, so that the at least one user-specific connection and a second user-specific connection can be planned on the at least one first link and the at least one second link, respectively.

9. The method as set forth in claim 1, wherein the network planning data is generated by a network management system and is transferred to the configuration tool over the Internet.

10. The method as set forth in claim 9, wherein the configuration tool generates configuration data for creating the at least one connection on the transmission network.

11. The method as set forth in claim 10, wherein the configuration tool transfers the configuration data to the network management system for creating the at least one connection.

12. The method as set forth in claim 11, wherein the network management system determines charge data for the capture of the configuration data or for the creation of the at least one user-specific connection.

13. The method as set forth in claim 12, wherein the network management system transfers the charge data to a billing facility.

14. The method as set forth in claim 9, wherein the configuration tool generates the configuration data for the at least one user-specific connection taking into account the availability of at least one configuration criterion relating to the network devices or the links between the other network devices which are necessary for the at least one user-specific connection, or checks an operator entry for creating at least one connection with respect to the at least one configuration criterion.

15. The method as set forth in claim 1, further comprising generating configuration data for setting up the at least one user-specific connection in the transmission network using the network planning data.

16. The method as set forth in claim 15, further comprising communicating the configuration data to a network-operator-side network management system for setting up the at least one user-specific connection, wherein the configuration data is converted into instruction data which is sent to the other network devices, and setting up the at least one user-specific connection according to the configuration data using the instruction data.

17. A network management system for configuring, by a user, at least one user-specific connection between access points of a transmission network, which are connectable to user-located network devices, the network management system comprising:
A configuration tool which allows the user to configure the at least one user-specific connection, and generates a representation of the transmission network based on network planning data, on the basis of which at least one availability criterion of other network devices or of links is determinable;
a server which determines network data about other network devices of the transmission network and about links between these other network devices via which the at least one user-specific connection can be established for generating the network planning data for the representation of the transmission network and provides the network planning data to the configuration tool, wherein the network planning data is generated on the basis of network data;
wherein the network data contains information of the structure of the transmission network and the availability of loads of the network devices, and the network planning data specifies geographical data of access points, and wherein the network planning data is derived from network data representative of a network topology of the transmission network.

18. The server of a network management system as set forth in claim 17, further comprising a server which transfers the network planning data to the configuration tool, over the Internet.

19. The network management system as set forth in claim 18, wherein the server comprises a connector which receives configuration data from the configuration tool and creates the at least one user-specific connection on the basis of the configuration data.

20. The network management system as set forth in claim 19, wherein the configuration data is converted into instruction data by the server, and the instruction data is sent to the other network devices by the server, and the server sets up the at least one user-specific connection according to the configuration data using the instruction data.

21. A non-transitory computer-readable medium having embodied thereon instructions that when executed a computer causes the computer to perform the steps of:
determining network data about other network devices of the transmission network and about links between these other network device via which at least one user-specific connection can be established;
generating network planning data for a representation of the transmission network, on the basis of which at least one availability criterion of the other network devices or of the links between the other network devices is determinable; and
providing the network planning data for a configuration tool for allowing the client user to configure the at least one connection, the configuration tool generating the representation on the basis of the network planning data;

generating the network planning data an a graphical representation of the transmission network on the basis of the network planning data by determining availability criteria on the network devices and the links and configuring the user-specific connection;

wherein the network data contains information of the structure of the transmission network and the availability and loads of the network devices, and the network planning data specifies geographical data access points; and wherein the network planning data is derived from network data representative of network topology of the transmission network.

22. The non-transitory computer readable medium as set forth in claim 21, further comprises generating configuration data for setting up the at least one user-specific connection in the transmission network using the network planning data.

23. The non-transitory computer readable medium as set forth in claim 22, further comprising communicating the configuration data to a network-operator-side network management system to set up the at least one user-specific connection, wherein the configuration data is converted into instruction data which is sent to the other network devices, and setting up the at least one user-specific connection according to the configuration data using the instruction data.

24. A configuration tool, configured as a configuration computer, for allowing a client user to configure at least one user-specific connection between access points and a transmission network which are connectable to user-located network devices, the configuration tool comprising:

a receiver which receives network planning data about other network devices of the transmission network and about links between these other network devices from a network management system, and a display which displays a graphical representation of the transmission network on the basis of the network planning data about other network devices of the transmission network and about links between other network devices via which the at least one user-specific connection can be established, the graphical representation containing the visualization of at least one availability criterion of the network devices or links; and a processor which generates a graphical representation of the transmission network on the basis of network planning data by determining availability criteria of the network devices and the links and configuring the user-specific connection, wherein the network data contains information of the structure of the transmission network and the availability of loads of the network devices, and the network planning data specifies geographical data of access points; and wherein the network planning data is derived from network data representative of a network topology of the transmission network.

25. The configuration tool as set forth in claim 24, wherein the configuration of the at least one user-specific connection comprises means for generating configuration data for creating the at least one user-specific connection on the transmission network or for transferring the configuration data to a network management system, so that the network management system can create the at least one connection on the basis of the configuration data.

26. The configuration tool as set forth in claim 25, wherein the means for generating the configuration data for the at least one connection takes into account at least one configuration criterion relating to the network devices or to links of the transmission network which are necessary for the at least one connection, or for checking, on the basis of the at least one configuration criterion, operator entries for creating the at least one connection.

27. The configuration tool as set forth in claim 24, further comprising means for generating configuration data for setting up the at least one user-specific connection in the transmission network using the network planning data.

28. The configuration tool as set forth in claim 27, further comprising communicating, by the configuration tool, the configuration data to a network-operator-side network management system for setting up the at least one user-specific connection, wherein the configuration data is converted into instruction data by a server and the instruction data is sent to the other network devices, and setting up the at least one user-specific connection according to the configuration data using the instruction data.

29. A non-transitory computer-readable medium having embodied thereon instructions that when executed by a computer causes the computer to configure at least one user-specific connection between access points on a transmission network, which are connectable to user located network devices on network, which are connectable to user-located network devices perform the steps of:

displaying a graphical representation, of the transmission network on the basis of network planning data about network devices of the transmission network and about links between the network devices via which at least one user-specific connection can be established by a client user, the graphical representation containing visualization of at least one availability criterion of the network devices or links;

wherein the network planning data is derived from network data representative of a network topology of the transmission network;

and generating the network planning data on the basis of the network data and a graphical representation of the transmission network on the basis of the network planning data by determining the availability criterion of the network devices and links and configuring the user specific connection.

30. The non-transitory computer readable medium according to claim 21, wherein the computer readable medium comprises at least one of a floppy disk, CD-ROM, Digital Versatile Disc, and a hard disk drive.

31. The non-transitory computer readable medium according to claim 29, wherein the computer readable medium comprises at least one of a floppy disk, CD-ROM, Digital Versatile Disc, and a hard disk drive.

* * * * *